Aug. 7, 1962    M. SIEGEL ETAL    3,047,991
IMPULSE SEALING APPARATUS
Filed May 2, 1961    3 Sheets-Sheet 3
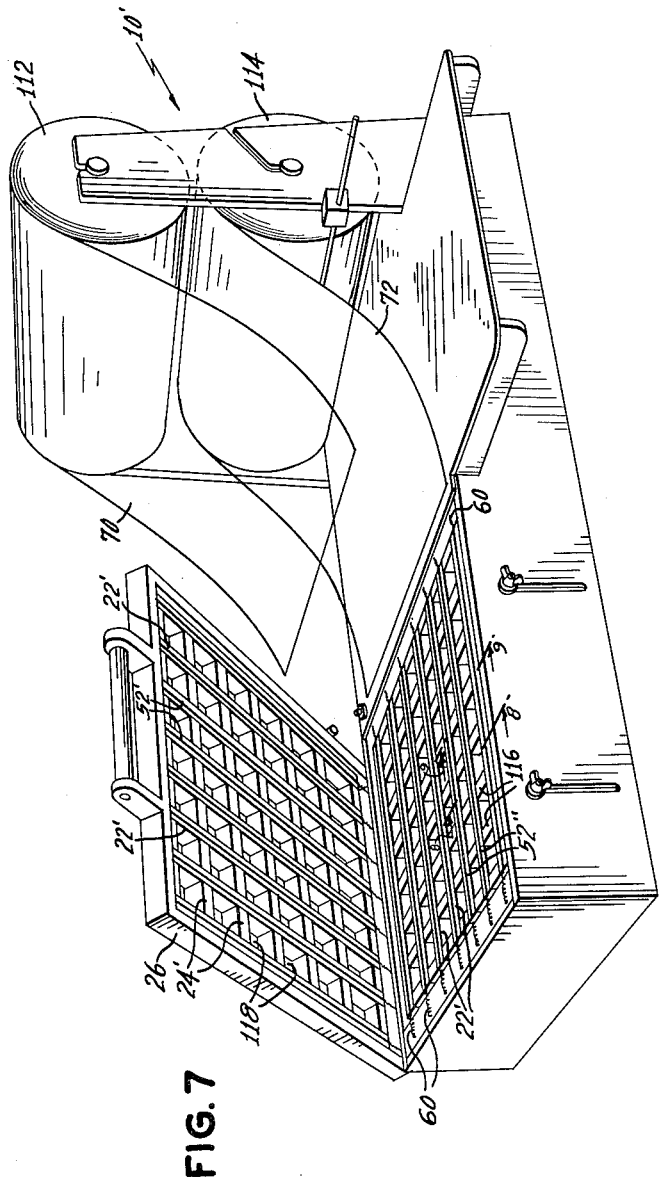
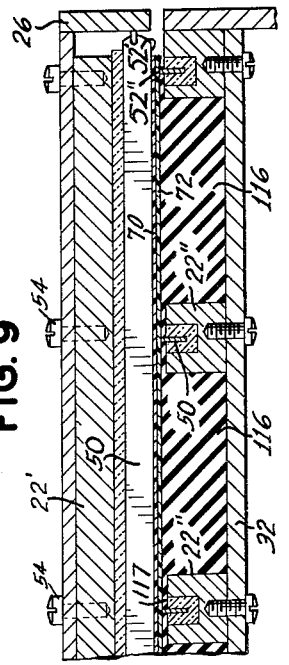
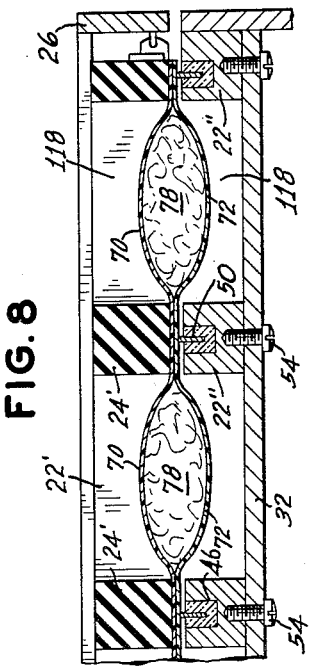
INVENTORS
MARTIN SIEGEL
SEYMOUR ZELNICK
BY
ATTORNEY

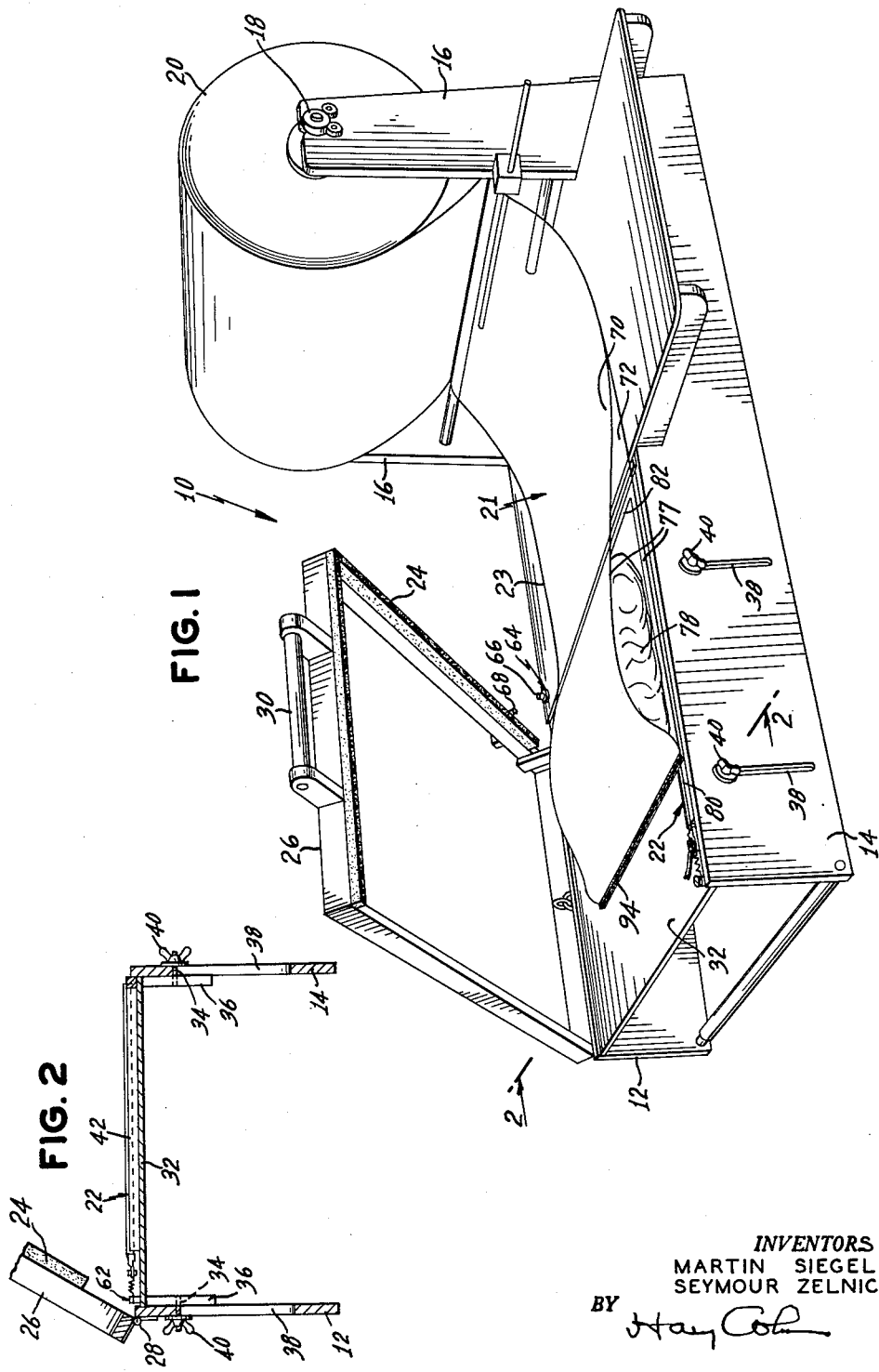
Aug. 7, 1962 — M. SIEGEL ETAL — 3,047,991
IMPULSE SEALING APPARATUS
Filed May 2, 1961 — 3 Sheets-Sheet 1
INVENTORS
MARTIN SIEGEL
SEYMOUR ZELNICK
BY
ATTORNEY

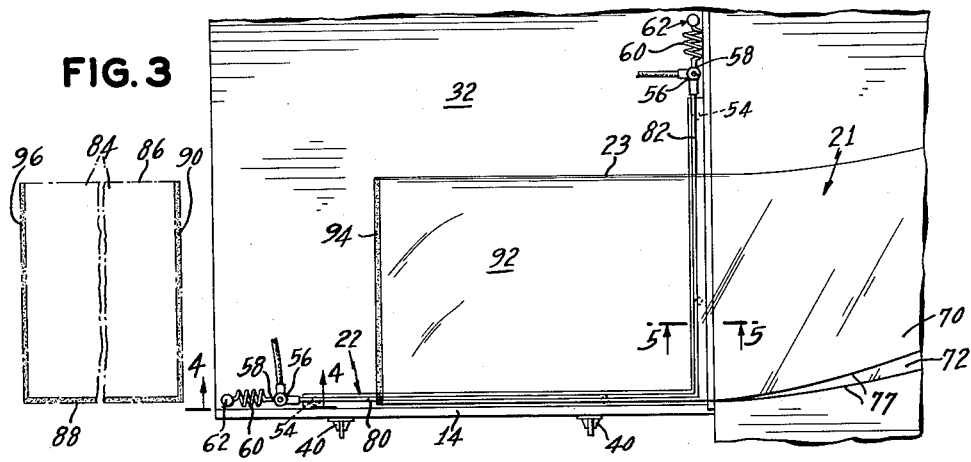
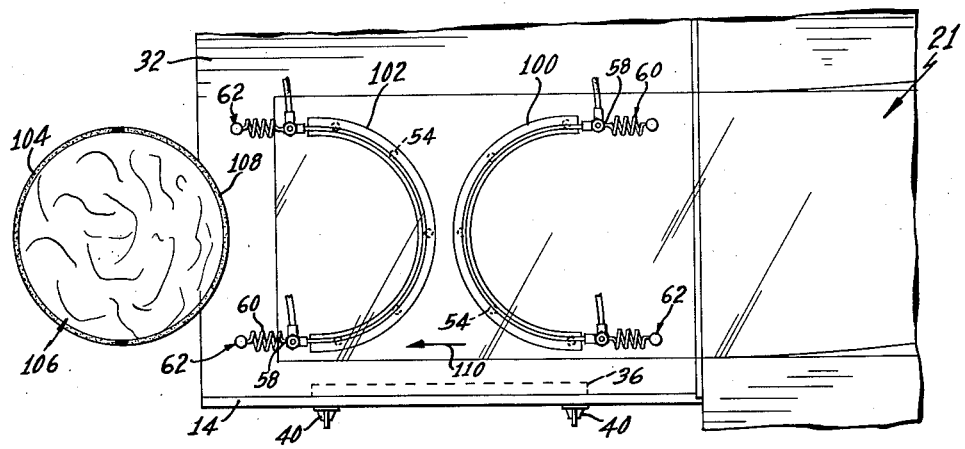
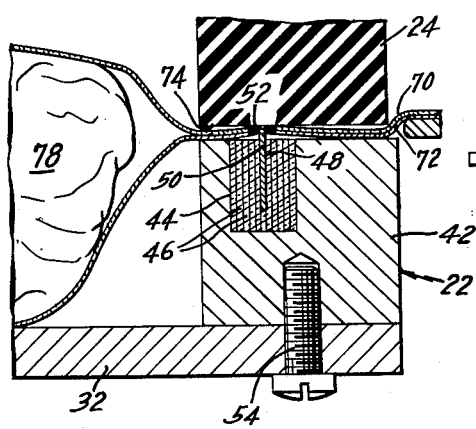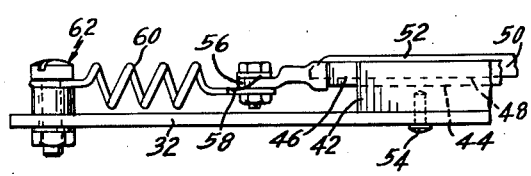

United States Patent Office 3,047,991
Patented Aug. 7, 1962

3,047,991
IMPULSE SEALING APPARATUS
Martin Siegel, Roslyn, N.Y., and Seymour Zelnick, Toms River, N.J., assignors to Weldotron Corporation, Newark, N.J., a corporation of New Jersey
Filed May 2, 1961, Ser. No. 114,588
6 Claims. (Cl. 53—182)

This invention relates to a method and an apparatus for forming individual sealed packages from a continuous web of heat-sealable material and, more particularly, to the formation of such packages by heat-sealing means of the impulse-heated type.

One of the objects of the present invention is the provision of heat-sealing apparatus having a heat-sealing member and which is constructed and arranged so as to provide very rapid heating followed by rapid cooling of the heat-sealing element in each operating cycle of the apparatus for forming a package.

Another object is to provide heat-sealing apparatus which is readily adaptable to the formation of sealed packages of selectively different peripheral edge contours with the use of a web of heat-sealable material having straight side edges.

Another object is the provision of a heat-sealing and cutting apparatus with a heat-sealing element which is free to expand and contract in response to the rapid heating and cooling thereof.

A further object is the provision of a heat-sealing and cutting member for sealing and cutting superimposed layers of heat-sealable material which is of improved design and construction to make it especially useful for impulse sealing operations.

A further object is generally to provide apparatus which is well adapted to form a series of heat-sealed packages in succession with the use of a longitudinally folded web of heat-sealable material or from superposed separate webs of such material.

Another object is to provide apparatus for simultaneously forming a group of individual heat-sealed packages.

The above and other objects, features and advantages of the invention will be fully understood from the following description of the presently preferred embodiments of the invention, considered in connection with the accompanying illustrative drawings.

In the drawings:

FIG. 1 is a perspective view of the apparatus;

FIG. 2 is a sectional view taken on line 2—2 of FIG. 1;

FIG. 3 is a top plan view of part of the apparatus with parts omitted for the purposes of illustration;

FIG. 4 is a detail view, on a larger scale, taken on line 4—4 of FIG. 3;

FIG. 5 is a sectional view, on a greatly enlarged scale, taken on line 5—5 of FIG. 3;

FIG. 6 is a top plan view of part of the apparatus in accordance with another embodiment of the invention, with parts omitted for the purposes of illustration;

FIG. 7 is a perspective view of another embodiment of the apparatus;

FIG. 8 is a sectional view, on a larger scale, taken on line 8—8 of FIG. 7, with the apparatus in heat-sealing and cutting position; and FIG. 9 is a sectional view, on a larger scale, taken on line 9—9 of FIG. 7, with the apparatus in heat-sealing and cutting position.

Referring now to the drawings in detail, the heat-sealing and cutting apparatus 10, which is essentially a packaging machine, comprises the horizontally spaced frame members 12 and 14 which have vertically extending parts 16 for supporting a horizontal roller 18 on which a supply roll 20 of heat-sealable packaging sheet material 21 is provided, for example transparent polyethylene. The sheet material may be manually withdrawn from the supply roll and moved in the direction of its length so that it is disposed between a heat-sealing and cutting member 22 and a cooperating pressure member 24 which is mounted on a manually movable head 26. The heat-sealable sheeting is folded longitudinally before being wound into its roll and the roll is so positioned that the folded edge, indicated at 23, is at the rear of the apparatus. The head is hinged to the frame, as indicated at 28, and is provided with a handle 30 for moving the head to and from pressure applying or sealing position wherein pressure is applied on the layers of material which are engaged between the sealing member 22 and the pressure member 24. The articles which are to be packaged in the sheet material are supported on a tray 32 whose vertical height is adjustable to accommodate various heights of articles. Adjustment of the tray is provided by studs 34 which are secured to blocks 36 that extend downwardly from the tray. The studs are movable in the vertical slots 38 provided in each frame member so that by loosening the wing nuts 40 the tray may be vertically adjusted.

The heat-sealing and cutting member 22 comprises an elongated bar 42 of a good heat conducting material, for example aluminum, and the bar has a relatively large mass so that it can quickly absorb and conduct heat so that the impulse heated sealing element cools rapidly when the heating current is interrupted. A longitudinally extending groove 44 is provided in the bar and is coextensive therewith and the groove is lined with a good heat insulating and electrically non-conducting material 46 on the side walls and bottom wall of the groove, for example a fiberglass lamination. The lamination lining the side walls of the groove are spaced from each other to form a relatively narrow groove 48 which is coextensive with the bar and is insulated therefrom. A thin elongated heat-sealing and cutting, ribbon-like, element 50 is positioned in the groove and the sides of the element are in sliding contact with the side walls of groove 48 so the element is free to expand and contract lengthwise in the groove. The sealing and cutting element 50 is made of a metal of high electrical resistance, for example, a nickel-chromium alloy steel which is also a high temperature metal. Ribbons 50 of about between .010″ to .020″ thickness have been found to give good results. The sealing and cutting element projects outwardly from groove 48 above the top surface of bar 42 to expose a thin heat-sealing and cutting edge 52.

Bar 52 is removably secured to the tray 32 by screws 54 and the ends of the element project from the ends of the bar 42 and are provided with terminals 56 to which are connected wire terminals 58 for supplying a short impulse of high current to the heat-sealing element for rapidly heating it for the heat-sealing and cutting operation. The ends of the element are each connected to one end of a tension spring 60 and the opposite end of the spring is fixed to the tray 32 by the electrically non-conducting screw, spacers and nut assembly 62. The springs apply tension along the length of the sealing and cutting element 50 and thereby insure smooth expanding and contracting movement of the element longitudinally in groove 48 and maintain the ribbon in taut condition during said expansion and contraction thereof. This is especially important in view of the fact that the heating current is applied to the element for a short impulse period and since it is very high and the element is thin and long, there is an approximately instantaneous heating and expansion of the element. When the current impulse is interrupted, there is a rapid cooling and corresponding contraction of the element against the spring tension.

The current-flow period is automatically controlled by a timer (not shown) which is actuated by a switch 64 whose movable contact 66 is in the path of movement of an actuating button 68 which is secured to the manually operated sealing head 26. As the sealing head is brought into closed and pressure applying position, as shown in FIG. 5, the button 68 actuates switch 64 and a short impulse of high current is applied to the sealing element 50 which causes the simultaneous sealing and cutting of the superimposed layers 70 and 72 (see FIG. 5) of the sheet material 21 by the sealing and cutting edge 52 of the element. The cooperating pressure member 24 is made of electrically non-conducting material, for example silicon rubber, and during the sealing and cutting operation the confronting surface 74 of the member acts as an abutment or platen for the edge 52 of the cutting and sealing member.

As shown in FIGS. 1 and 3, the superimposed layers 70 and 72 of the sheet material 21 are joined to each other along the folded edge 23. The side edges 77 of the material, opposite the fold 23 are separable so that the articles 78 which are to be packaged can be inserted between the layers 70 and 72. The sealing member 22 and the pressure member 24 are each L-shaped, for forming a rectangular shaped package. Accordingly, when the pressure member is moved into pressure applying position against the sealing and cutting edge 52, the side edge portions 77 of the material are sealed and cut simultaneously by the longitudinally extending part 80 of element 50 and simultaneously the material is cut and sealed by the transverse part 82 of element 50 along a line which extends transversely of the material from the fold 23 to the now sealed portion of the opposite side edge 77. This operation separates the material into a forward portion 84 (see FIG. 3) having joined side edges 86 and 88 and a sealed end 90 which connects and extends transversely of the side edges. The rear portion 92 of the material, which is still integral with the web which is withdrawn from the supply roll 20, has a sealed and cut end 94 which is formed simultaneously with the formation of sealed end 90 of the forward part. In other words, upon completing a sealing and cutting operation a forward portion of the material is separated from the web and simultaneously the open side edge of this portion is sealed, as shown at 88, and its rear end 90 is also sealed resulting in a package 84 which is sealed on all four sides since it will be readily apparent that the previous folded edge 23 forms the joined side edge 86 of the package and the forward end 96 of the package has been previously sealed, in a similar manner to end 94 of the rear portion 92, by a previous sealing and cutting operation. Of course, at the beginning of the operation of the machine with a new supply roll 20, the forward end of the material is open so that the first cutting and sealing operation does not provide a completely sealed package but the next operation results in a completely sealed package.

In FIG. 6 there is shown another embodiment of the invention wherein it is not necessary to provide folded material since the fold is not utilized to provide a joined edge for the package. The package is formed from two superimposed strips or webs of heat-sealable material which may be supplied from a roll in a similar manner as described previously. The heat-sealing and cutting means shown in FIG. 6 comprises a pair of heat-sealing and cutting members 100 and 102 which are spaced from each other in the direction of movement of the material. The rear member 100 has a configuration, as herein shown a semicircle, for sealing and cutting the superimposed layers of material along a line forming the forward part 104 of the completed package 106. The forward member 102 has a configuration, as herein shown a semicircle, for forming the rear part 108 of the package 106.

In operating the apparatus shown in FIG. 6, the material is withdrawn from the supply roll 20 and is placed in position overlying the sealing and cutting members 100 and 102. Upon completing a sealing and cutting operation, by closing the head 26, which are provided with pressure members of suitable configuration, upon the members 100 and 102, the rear part of a forward package is formed by member 102 and the forward part of a rear package is formed by member 100. The action of member 102 completes the formation of the forward package since the forward part of this package has been previously formed by rear member 100 when that portion of the material was overlying member 100. To complete the rear package whose forward part has been formed by member 100, the material is moved forwardly in the direction of arrow 110 so that the rear part of the rear package is superimposed over member 102 and the formation of the rear package is completed when the head 26 is again moved into heat-sealing and cutting position. The heat-sealing elements 100 and 102 are somewhat longer than semicircles in order that the packages may be completely sealed without precision design of said elements in relation to each other. It is apparent that a sealing and cutting operation of the embodiment of the apparatus shown in FIG. 6 completes the formation of a forward package and separates said package from the material and simultaneously forms the forward part of the next package which is rearwardly of the forward package. While the configuration of members 100 and 102 are shown as semicircles, it is within the scope of the invention to provide heat-sealing and cutting members having various other configurations other than that which is shown.

The ends of each of members 100 and 102 is provided with the springs 60 so that the sealing and cutting element 50 is under a tension force which extends along the length of the element, for the reasons previously discussed. The fact that the heat-sealing and cutting members are not endless enables this tension force to be easily applied along the length of the sealing element. Obviously, as indicated with respect to the embodiment of the invention shown in FIG. 3, at the initiation of the operation the first heat-sealing and cutting operation does not provide a completed forward package since the forward part of said package has not been previously formed.

Thus it is seen that the apparatus described above is well adapted to accomplish the purposes of the invention. The low thermal mass of the heated element 50 and its high electric resistance enable it to reach its sealing temperature very rapidly when current is transmitted therethrough as soon as switch 64 is closed by the movement of head 26 to operative position. The fiberglass insulation between element 50 and bar 42 adequately insulates said element electrically as well as thermally from bar 42 so that element 50 can be rapidly heated by the impulse current and yet the large thermal mass of said bar results in the maintenance of low temperature of the other parts of sealing member 22. This also has the effect of rapidly cooling element 50 between current pulses so that improved pressure sealing is obtained without impairment of the heat sealed edges of the package when head 26 is held in operative position after the current pulse is terminated under the control of the timer or in any other way. It will be understood that the insulation between element 50 and bar 42 is sufficient to enable element 50 to be rapidly heated and yet is thin enough to allow the flow of heat therefrom to bar 42 between heat pulses. Preferably, the thickness of the insulation at each side of the ribbon is one-sixteenth of an inch. It will be noted further that bar 42 acts as a heat sink by reason of its own large thermal mass and that since the frame of the machine is made of metal and is in thermal-conductive relation to said bar additional thermal and conduction takes place, if needed, to prevent excess heating of said bar.

As is readily apparent and as mentioned above, the construction of the heat-sealing and cutting members 22 is especially well adapted to provide packages having various peripheral contours, for example, curvilinear contours or contours having both straight portions and curved portions. It will also be apparent that in lieu of providing a web of folded material, as indicated at 23, the material can be supplied in the form of separate sheets, as shown in FIG. 7, wherein the individual sheets are supplied from rolls 112 and 114, respectively. In the case where separate sheets are used, the heat-sealing and cutting member 22 is U-shaped for forming individual rectangular or square packages since another heat-sealing and cutting part opposite part 80 and similar to said part is needed for the previously described L-shaped sealer and cutter to form the sealed edge previously provided by the folded edge 23 of the material. Of course, with respect to the embodiment of the invention shown in FIG. 6, the members 100 and 102 need not be altered since these members can be used with either folded material or separate sheets of superposed material.

Referring now more specifically to FIGS. 7, 8 and 9, the heat-sealing and cutting apparatus 10' is operable to form simultaneously a group of individual sealed rectangular or square packages. The movable head 26 is provided with a series of laterally spaced parallel heat-sealing and cutting members 22' whose sealing and cutting edges 52' extend transversely of the apparatus and the tray 32 of the apparatus is provided with a series of laterally spaced parallel heat-sealing and cutting members 22" whose sealing and cutting edges 52" extend longitudinally of the apparatus at right angles to the edges 52' of the members on head 26, and edges 52' and 52" are in confronting relation. When head 26 is moved to heat-sealing and cutting position, the sealing edges 52', 52" of the members 22', 22", respectively, form a pattern of squares or rectangles.

Head 26 is provided with a series of pressure members 24' which are positioned to overlie the sealing edges 52" when head 26 is in sealing position and, similarly, tray 32 is provided with a series of pressure members 116 which are in confronting relation with edges 52' when the head is in sealing position. Members 24' and 116 are T-shaped in vertical cross section and have flanges 117 which bear against the upper sides of the adjacent sealing elements 50 and the edges of insulation 46 and bar 42 of the adjacent members 22' or 22" and their pressure bearing surfaces are flush with the sealing edges of the adjacent cutting and sealing members. It will be observed that except where members 22' and 22" cross, the cutting edges of the members bear against the confronting surface of the pressure members 24' or 116. The checkerboard pattern provided by members 22', 22" and members 24', 116 provides a series of recesses 118 into which the articles which are to be packaged extend. It is to be noticed that each of the sealing and cutting elements 50 is spring-biased, as previously described and members 22' and 22" are constructed as previously described.

In the operation of the apparatus, the lower layer 72 of material is withdrawn from its roll 114 and superimposed over the sealing and cutting members 22'. The articles 78 which are to be packaged are placed on the upper surface of the withdrawn material at the position of each recess 118 and the upper layer is then withdrawn from its roller 114 and placed over the articles in confronting relation with the lower layer of material. The head 26 is then moved down and closed in heat-sealing and cutting position and a short impulse of high current is simultaneously supplied to the heat-sealing and cutting elements 50 of members 22' and 22" to heat-seal and cut the material and form the individual packaged articles. If the material has been folded to form the layers then a movable arm can be provided to separate and hold the upper layer of material from the lower layer of material while the articles are placed in position on the upper surface of the lower layer.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

Having thus described our invention what we claim and desire to secure by Letters Patent is:

1. Heat-sealing apparatus of the heat pulse type for sealing and simultaneously cutting heat-sealable sheet material, comprising a heat-sealing and cutting ribbon of high temperature and high resistance metal adapted to be pulse-heated by an electrical current passed therethrough, means for supporting said ribbon with a side edge positioned to engage the heat-sealable material for both the sealing and cutting operation when said ribbon is pulse-heated, said supporting means having provision for the longitudinal expansion of said ribbon when it is pulse-heated and for the longitudinal contraction of the ribbon between heating pulses, said supporting means having a groove with spaced side walls between which said ribbon is mounted for movement longitudinally of said groove when said ribbon expands and contracts, electrical insulation in said groove for electrically insulating said ribbon from said supporting means and holding said ribbon against movement transversely of said groove, the opposite sides of said ribbon being in sliding engagement with said insulation longitudinally of the ribbon, means operatively connected to said ribbon for maintaining said ribbon in taut condition longitudinally thereof during its expansion and contraction on said supporting means in said slidable engagement with said insulation, said supporting means having a large thermal mass in relation to the thermal mass of said ribbon for rapid cooling of the ribbon between heat pulses, and a pressure member cooperating with said heat-sealing and cutting ribbon for effecting the heat-sealing and cutting operation when said ribbon is pulse heated by the intermittent passage of electric current therethrough.

2. Heat-sealing apparatus of the heat pulse type for sealing and simultaneously cutting heat-sealable sheet material, comprising a heat-sealing and cutting ribbon of high temperature and high resistance metal adapted to be pulse-heated by an electrical current passed therethrough, means for supporting said ribbon with a side edge positioned to engage the heat-sealable material for both the sealing and cutting operation, when said ribbon is pulse-heated, said supporting means having provision for the longitudinal expansion of said ribbon when it is pulse-heated and for the longitudinal contraction of the ribbon between heating pulses said supporting means having a groove with spaced side walls between which said ribbon is mounted for movement longitudinally of said groove when said ribbon expands and contracts, electrical insulation in said groove for electrically insulating said ribbon from said supporting means and holding said ribbon against movement transversely of said groove, the opposite sides of said ribbon being in sliding engagement with said insulation longitudinally of the ribbon, and means operatively connected to said ribbon for maintaining said ribbon in taut condition longitudinally thereof during its expansion and contraction on said supporting means, said supporting means having a large thermal mass in relation to the thermal mass of said ribbon for rapid cooling of the ribbon between heat pulses, the groove of said supporting means being L-shaped and said pulse-heated ribbon and insulation being correspondingly L-shaped, said means for maintaining said ribbon in taut condition comprising tension spring means connected to the remote ends of said L-shaped ribbon.

3. Heat-sealing apparatus of the heat pulse type for sealing and simultaneously cutting heat-sealable sheet material, comprising a heat-sealing and cutting ribbon of high temperature and high resistance metal adapted to be pulse-heated by an electrical current passed therethrough, means for supporting said ribbon with a side edge positioned to engage the heat-sealable material for both the sealing and cutting operation when said ribbon is pulse-heated, said supporting means having provision for the longitudinal expansion of said ribbon when it is pulse-heated and for the longitudinal contraction of the ribbon between heating pulses, said supporting means having a groove with spaced side walls between which said ribbon is mounted for movement longitudinally of said groove when said ribbon expands and contracts, electrical insulation in said groove for electrically insulating said ribbon from said supporting means and holding said ribbon against movement transversely of said groove, the opposite sides of said ribbon being in sliding engagement with said insulation longitudinally of the ribbon, and means operatively connected to said ribbon for maintaining said ribbon in taut condition longitudinally thereof during its expansion and contraction on said supporting means, said supporting means having a large thermal mass in relation to the thermal mass of said ribbon for rapid cooling of the ribbon between heat pulses, the groove of said supporting means having a longitudinally curvilinear contour and said pulse-heated ribbon and said insulation being correspondingly curvilinear longitudinally of said groove.

4. Apparatus for forming sealed packages of heat-sealable material, comprising a heat-sealing and cutting member, a cooperating pressure member, means mounting said members for relative movement toward each other for applying pressure to said heat-sealable material interposed between said members for the cutting and heat-sealing operation, said heat-sealing and cutting member comprising an elongated bar of heat-conducting material having a longitudinally extending groove coextensive therewith, heat insulating and electrically non-conducting material disposed in said groove and having a relatively narrow longitudinally extending groove coextensive with said bar, a relatively thin elongated heat-sealing and cutting element of electrically high resistant material, pulse heated by the passage of electric current therethrough, mounted for sliding movement longitudinally in said last mentioned groove to permit longitudinal expanding and contracting movements of said element and having a portion projecting from said heat insulating and electrically non-conducting material to expose a heat-sealing and cutting edge, the width of said element being greater than its thickness and mounted in said last mentioned groove in widthwise parallel relation between the opposite sides of said grooves and held against movement transversely of said grooves by said non-conducting material but movable longitudinally of said grooves when its length increases and decreases, as the result of the heat generated therein by the passage of current therethrough, the opposite sides of said heat-sealing and cutting element being in engagement with said non-conducting material, and spring means secured to said element for supplying a tension force longitudinally thereof to maintain said heating element in taut condition in said groove in said sliding engagement with said non-conducting material during the longitudinal expansions and contractions of said element in said groove when said element is pulse-heated.

5. Apparatus for forming sealed packages from two superimposed layers of heat-sealable material, comprising heat-sealing and cutting means adapted to be pulse-heated by the intermittent passage of electric current therein, cooperating pressure means, means for mounting said heat sealable material for movement in the direction of its length between said sealing and pressure means, means mounting said sealing and pressure means for relative movement toward each other for applying pressure to said interposed material for the sealing and cutting operation, said heat-sealing and cutting means comprising a pair of forward and rear members spaced from each other in the direction of movement of said material, the rear member having a longitudinally curved configuration for sealing and cutting the material along a line forming the forward peripheral part of a rear package, and the forward member having a configuration for cutting and sealing the material along a line forming the rear peripheral part of a forward package and thereby completing the separation and sealing of said forward package from the material, a support for each of said heat-sealing and cutting members having a groove conforming to the configuration of the companion heat-sealing and cutting member, each of said supports having a large thermal mass in relation to the thermal mass of the companion heat-sealing element for rapid cooling of said heating element between heat pulses, electrical insulation in said grooves slidably engaged by the opposite sides of the companion heat-sealing element during the longitudinal expansion and contraction thereof incidental to the pulse-heating of the element and preventing movement of the heat-sealing element laterally of the groove, spring means connected to said heat-sealing elements, respectively, to maintain them in taut condition longitudinally thereof, and means for intermittently electrically heating said heat-sealing and cutting means by passing current therethrough intermittently for pulse sealing and simultaneous cutting operations of said forward and rear sealing and cutting members.

6. Apparatus for forming sealed packages from two superimposed layers of heat-sealable material, comprising heat-sealing and cutting means adapted to be pulse-heated by the intermittent passage of electric current therein, cooperating pressure means, means for mounting said heat sealable material for movement in the direction of its length between said sealing and pressure means, means mounting said sealing and pressure means for relative movement toward each other for applying pressure to said interposed material for the sealing and cutting operation, said heat-sealing and cutting means comprising a pair of forward and rear members spaced from each other in the direction of movement of said material, the rear member having a curved configuration for sealing and cutting the material along a line forming the forward peripheral part of a rear package, and the forward member having a curved configuration for cutting and sealing the material along a line forming the rear peripheral part of a forward package and thereby completing the separation and sealing of said forward package from the material, a support for each of said heat-sealing and cutting members having a groove conforming to the configuration of the companion heat-sealing and cutting member, each of said supports having a large thermal mass in relation to the thermal mass of the companion heat-sealing element for rapid cooling of said heating element between heat pulses, electrical insulation in said grooves slidably engaged by the opposite sides of the companion heat-sealing element during the longitudinal expansion and contraction thereof incidental to the pulse-heating of the element and preventing movement of the heat-sealing element laterally of the groove, spring means connected to the opposite ends of each of said heat-sealing and cutting members to apply a tension force along the length of said members, and means for transmitting an electric current through said sealing and cutting members for heating said heat-sealing and cutting means for the sealing and cutting operation.

References Cited in the file of this patent

UNITED STATES PATENTS

| | | |
|---|---|---|
| 2,479,375 | Langer | Aug. 16, 1949 |
| 2,510,383 | Dalgleish | June 6, 1950 |
| 2,596,677 | Gosling | May 13, 1952 |
| 2,627,213 | Nye | Feb. 3, 1953 |
| 2,630,396 | Langer | Mar. 3, 1953 |
| 2,638,963 | Frederick | May 19, 1953 |
| 2,679,280 | Marsh | May 25, 1954 |
| 2,727,859 | Allison et al. | Mar. 13, 1956 |
| 2,745,463 | Rempel | May 15, 1956 |
| 2,796,913 | Fener | June 25, 1957 |
| 2,824,596 | Crawford | Feb. 25, 1958 |
| 2,919,530 | Garson et al. | Jan. 5, 1960 |
| 2,947,127 | Herman | Aug. 2, 1960 |
| 2,961,031 | Fener | Nov. 22, 1960 |
| 3,006,122 | Weishaus | Oct. 31, 1961 |
| 3,023,558 | Mitchell | Mar. 6, 1962 |